US012775121B2

(12) United States Patent
Son

(10) Patent No.: US 12,775,121 B2
(45) Date of Patent: Oct. 27, 2026

(54) HIGH PRECISION FACET STRUCTURES FOR REFLECTIVE WAVEGUIDES

(71) Applicant: GOOGLE LLC, Mountain View, CA (US)

(72) Inventor: Hui Son, Hayward, CA (US)

(73) Assignee: GOOGLE LLC, Mountain View, CA (US)

( * ) Notice: Subject to any disclaimer, the term of this patent is extended or adjusted under 35 U.S.C. 154(b) by 387 days.

(21) Appl. No.: 18/202,127

(22) Filed: May 25, 2023

(65) Prior Publication Data

US 2024/0377554 A1 Nov. 14, 2024

Related U.S. Application Data

(60) Provisional application No. 63/464,691, filed on May 8, 2023.

(51) Int. Cl.

*G02B 1/10* (2015.01)
*G02B 27/01* (2006.01)
*G02B 27/14* (2006.01)

(52) U.S. Cl.

CPC ........... *G02B 1/10* (2013.01); *G02B 27/0172* (2013.01); *G02B 27/142* (2013.01)

(58) Field of Classification Search

CPC ..... G02B 1/10; G02B 27/0172; G02B 27/142
See application file for complete search history.

(56) References Cited

U.S. PATENT DOCUMENTS

2006/0094340 A1 5/2006 Ouderkirk et al.
2008/0260322 A1* 10/2008 Thapliya .............. G02B 6/2813 385/9
2009/0067799 A1 3/2009 Nakane
2010/0040337 A1 2/2010 Suzuki et al.
2016/0334562 A1* 11/2016 Richards .............. G02B 6/0035
2023/0125794 A1* 4/2023 Alim .................. C08G 18/3876 359/630

FOREIGN PATENT DOCUMENTS

CN 114924413 A 8/2022

* cited by examiner

*Primary Examiner* — Mariam Qureshi

(57) ABSTRACT

A dual-stage process is implemented to achieve a desired shape degree of flatness and parallelism of a reflective waveguide facet structure. In a first stage, a coarse substrate having two major surfaces opposite each other and a series of facets that approximate a target shape and degree of smoothness is formed. In a second stage, at least one major surface of the coarse substrate is coated with a veneer, and the veneer is shaped using a mold formed by a high-precision tool such as a diamond turned tool to the target shape and flatness of the series of facets. After the veneer is shaped to the desired shape and degree of flatness, the veneer is coated with a reflective coating and the series of facets is embedded in plastic.

20 Claims, 6 Drawing Sheets

HIGH PRECISION FACET STRUCTURES FOR REFLECTIVE WAVEGUIDES

BACKGROUND

The present disclosure relates generally to augmented reality (AR) eyewear, which fuses a view of the real world with a heads-up display overlay. Wearable display devices, which include wearable heads-up displays (WHUDs) and head-mounted display (HMD) devices (all of which may be used interchangeably herein), are wearable electronic devices that combine real world and virtual images via one or more optical combiners, such as one or more integrated combiner lenses, to provide a virtual display that is viewable by a user when the wearable display device is worn on the head of the user. One class of optical combiner uses a waveguide (also termed a lightguide) to transfer light. In general, light from a projector of the wearable display device enters the waveguide of the optical combiner through an incoupler, propagates along the waveguide, and exits the waveguide through an outcoupler. If the pupil of the eye is aligned with one or more exit pupils provided by the outcoupler, at least a portion of the light exiting through the outcoupler will enter the pupil of the eye, thereby enabling the user to see a virtual image. Since the combiner lens is transparent, the user will also be able to see the real world.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Reflective waveguides can enable high efficiency, small form factor augmented reality (AR) displays with uniform display quality having limited artifacts (low eye glow, low rainbow, etc.). Plastic reflective waveguide AR displays require the ability to fabricate structures with ultra-high flatness and parallelism, which is challenging for plastic molding processes. Current polymer reflective waveguide fabrication processes use a pressure molding process in which the mold is fabricated by diamond turning machining. The pressure molding process is performed at relatively high temperatures. As the mold cools, it is subject to shrinkage, which can cause hollows or indentations to form on the outer surface of the mold. Such hollows or indentations reduce the efficiency with which the waveguide couples display light to the eye of a user and diminish the image quality, negatively impacting the user experience. Further, current fabrication processes using glass substrates require excess material that is typically removed and wasted during final formation.

To achieve the desired shape and degree of smoothness (e.g., flatness) and parallelism of a reflective waveguide facet structure (also referred to herein as a grating), FIGS. 1-5 illustrate techniques for forming a coarse substrate having two major surfaces opposite each other and a series of facets that approximate a target shape and degree of smoothness, coating at least one major surface of the coarse substrate with a veneer, and shaping the veneer using a high-precision tool such as a diamond turned tool to the target shape and flatness of the series of facets. After the veneer is shaped to the desired shape and degree of smoothness, the veneer is coated with a reflective coating.

In some embodiments, the coarse substrate is formed by compression injection molding a plastic substrate to the approximate shape of the series of facets. Only one major surface of the coarse substrate is coated with the veneer in some embodiments, whereas in other embodiments, both major surfaces of the coarse substrate are coated with the veneer. The compression injection molding is performed at a relatively high temperature, after which the coarse substrate cools. In some embodiments, the veneer is a curable index-matched polymer that is applied after the coarse substrate has cooled. Thus, the veneer is subject to significantly less absolute shrinkage than that which occurs during cooling after injection molding. In some embodiments, the reflective coating is a thin film dielectric stack. By dividing the fabrication process into formation of a coarse substrate and shaping of a veneer, the reflective waveguide structure is not subject to image degrading shrinkage and the target shape and degree of flatness are attainable at relatively low cost and with less waste than conventional processes.

Figure 1:
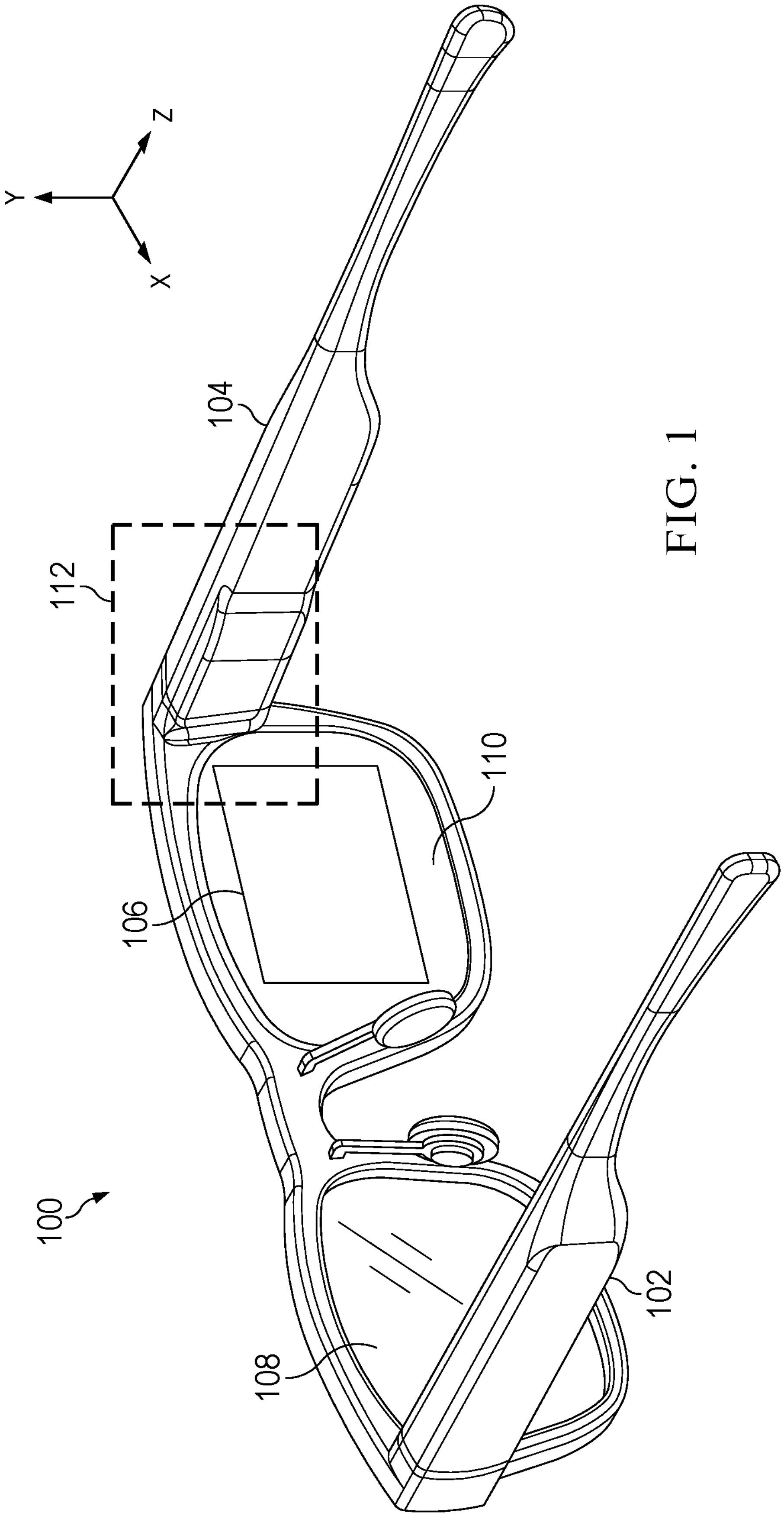
FIG. 1 is a diagram illustrating a rear perspective view of an augmented reality display device implementing image rotation control using reflective waveguide facets in accordance with some embodiments.

FIG. 1 illustrates an example AR eyewear display system 100 implementing image rotation control using reflective waveguide facets in accordance with some embodiments. The AR eyewear display system 100 includes a support structure 102 (e.g., a support frame) to mount to a head of a user and that includes an arm 104 that houses a laser projection system, micro-display (e.g., micro-light emitting diode (LED) display), or other light engine configured to project display light representative of images toward the eye of a user, such that the user perceives the projected display light as a sequence of images displayed in a field of view (FOV) area 106 at one or both of lens elements 108, 110 supported by the support structure 102. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like.

The support structure 102 further can include one or more batteries or other portable power sources for supplying power to the electrical components of the AR eyewear display system 100. In some embodiments, some or all of these components of the AR eyewear display system 100 are fully or partially contained within an inner volume of support structure 102, such as within the arm 104 in region 112 of the support structure 102. In the illustrated implementation, the AR eyewear display system 100 utilizes a spectacles or eyeglasses form factor. However, the AR eyewear display system 100 is not limited to this form factor and thus may have a different shape and appearance from the eyeglasses frame depicted in FIG. 1.

One or both of the lens elements 108, 110 are used by the AR eyewear display system 100 to provide an AR display in which rendered graphical content can be superimposed over or otherwise provided in conjunction with a real-world view as perceived by the user through the lens elements 108, 110. For example, laser light or other display light is used to form a perceptible image or series of images that are projected onto the eye of the user via one or more optical elements, including a waveguide, formed at least partially in the corresponding lens element. One or both of the lens elements 108, 110 thus includes at least a portion of a waveguide that routes display light received by an incoupler (IC) (not shown in FIG. 1) of the waveguide to an outcoupler (OC) (not shown in FIG. 1) of the waveguide, which outputs the display light toward an eye of a user of the AR eyewear display system 100. Additionally, the waveguide employs an exit pupil expander (EPE) (not shown in FIG. 1) in the light path between the IC and OC, or in combination with the OC, in order to increase the dimensions of the display exit pupil. Each of the lens elements 108, 110 is sufficiently transparent to allow a user to see through the lens elements to provide a field of view of the user's real-world environment such that the image appears superimposed over at least a portion of the real-world environment.

To allow for a smaller, more compact form-factor, in some embodiments, one or more of the IC, OC, and/or EPE use reflective waveguide facets either to reflect light from one surface of the waveguide back to the same surface or to allow light to travel through the facets from one surface of the waveguide to a different, opposing surface of the waveguide. In order to provide uniform display quality with limited artifacts, the reflective waveguide facets must have a high degree of flatness.

Figure 2:
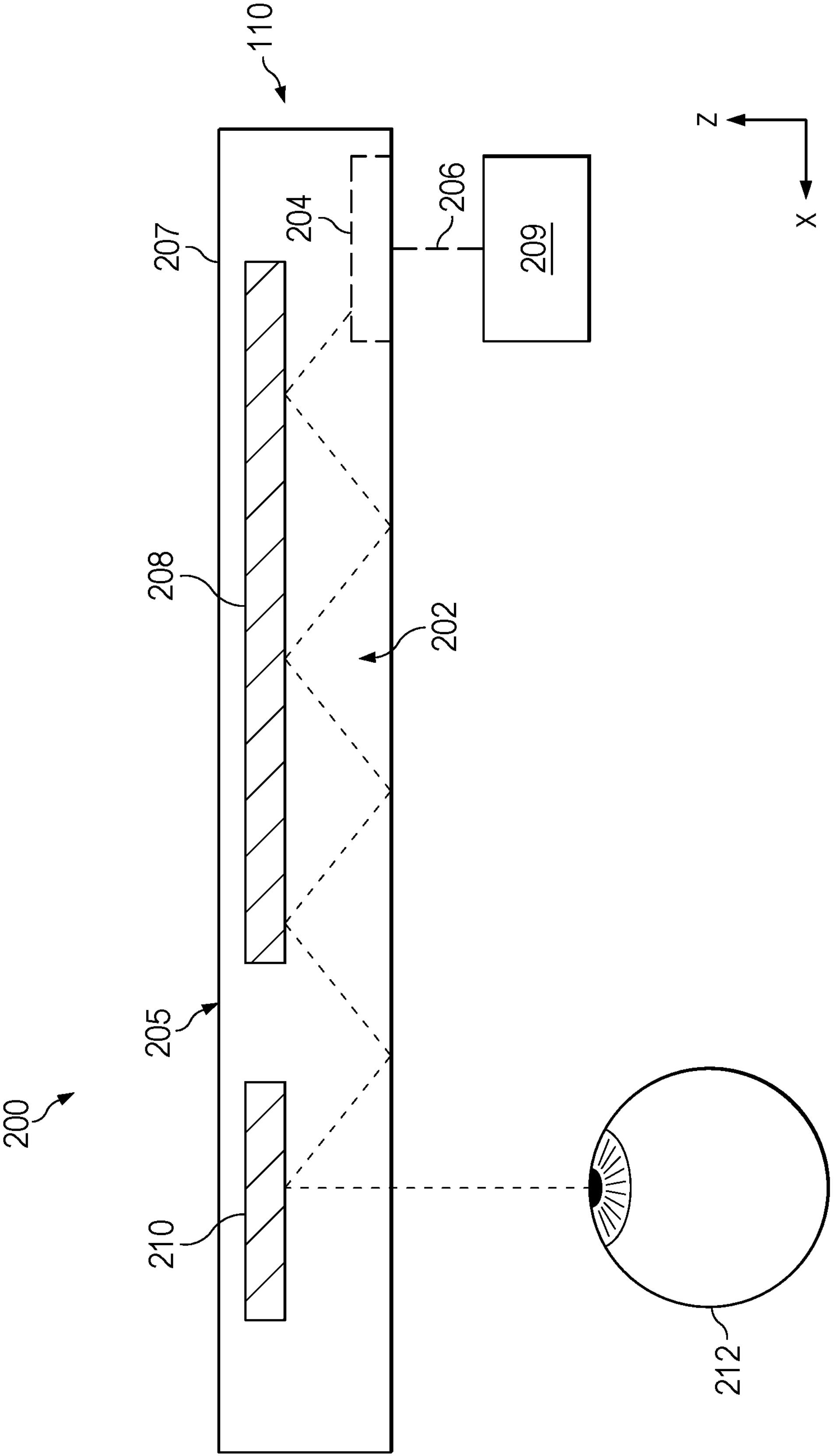
FIG. 2 is a diagram illustrating a cross-section view of an example implementation of a waveguide in accordance with some embodiments.

FIG. 2 depicts a cross-section view of an implementation of a display system 200 partially included in a lens element such as lens element 110 of an AR eyewear display system such as AR eyewear display system 100, which in some embodiments comprises a waveguide 202. Note that for purposes of illustration, at least some dimensions in the Z direction are exaggerated for improved visibility of the represented aspects.

The waveguide 202 includes an incoupler 204 and an outcoupler 210. The term "waveguide," as used herein, will be understood to mean a combiner using one or more of total internal reflection (TIR), specialized filters, and/or reflective surfaces, to transfer light from an incoupler (such as the incoupler 204) to an outcoupler (such as the outcoupler 210). In some display applications, the light is a collimated image, and the waveguide transfers and replicates the collimated image to the eye. In general, an incoupler and outcoupler each include, for example, one or more optical grating structures, including, but not limited to, reflective gratings, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection.

In the present example, the display light 206 received at the incoupler 204 is relayed to the outcoupler 210 via the waveguide 202 using TIR. The display light 206 is then output to the eye 212 of a user via the outcoupler 210. As described above, in some embodiments the waveguide 202 is implemented as part of an eyeglass lens, such as the lens 108 or lens 110 (FIG. 1) of the display system having an eyeglass form factor and employing the display system 200.

In this example implementation, the waveguide 202 implements facets in the region 208 (which provide exit pupil expansion functionality) and facets of the region 210 (which provide OC functionality) toward the world-facing side 207 of the waveguide 202 and the lens element 110, and the facets of the IC 204 are implemented toward the eye-facing side 205 of the lens element 110. Thus, under this approach, display light 206 from a light source 209 is incoupled to the waveguide 202 via the IC 204, and propagated (through total internal reflection in this example) toward the region 208, whereupon the facets of the region 208 reflect the incident display light for exit pupil expansion purposes, and the resulting light is propagated to the facets of the region 210, which output the display light toward a user's eye 212. In other embodiments, the facets of the IC 204 are implemented toward the world-facing side 207 of the lens element 110.

Embodiments of reflective waveguide structures formed according to the techniques described herein achieve uniform display quality with limited artifacts using reflective waveguide facets, as described further hereinbelow. For example, in some embodiments, the facets allow display light to travel through the facets from one surface of the waveguide to a different, opposing surface of the waveguide rather than, e.g., reflecting the light from one surface back onto the same surface. In some embodiments, as described further hereinbelow, the facets are formed to have a desired shape and degree of flatness that enable this functionality.

Figure 3:
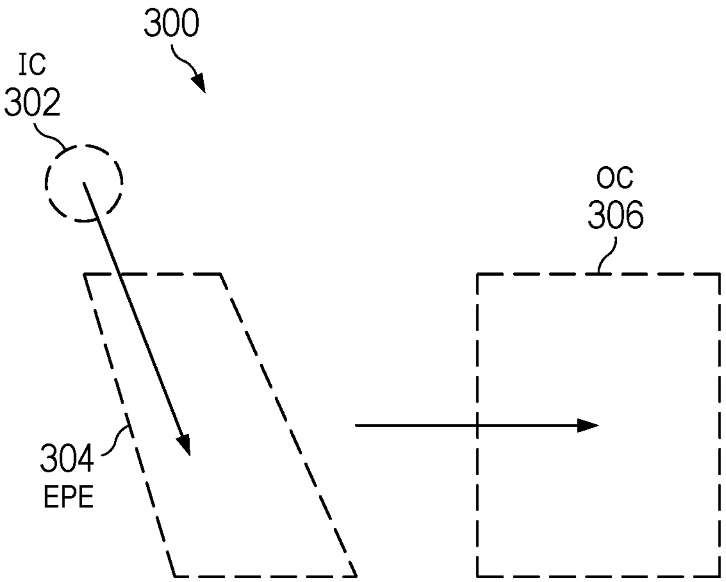
FIG. 3 is a diagram illustrating basic functions of an optical combiner in accordance with some embodiments.

FIG. 3 is a diagram illustrating basic functions of an optical combiner 300 in accordance with some embodiments. A waveguide-based optical combiner (or "waveguide combiner") is often used in AR-based near-eye displays to provide a view of the real world overlayed with static imagery or video (recorded or rendered). As illustrated in FIG. 3, such optical combiners typically employ an IC 302 to receive display light from a display source (not shown), an EPE 304 to increase the size of the display exit pupil, and an OC 306 to direct the resulting display light toward a user's eye. In some embodiments, the requisite flatness or smoothness of reflective waveguide facets is achieved by injection compression molding a coarse substrate having a series of facets with a shape that is within hundreds of microns of a desired shape, coating the facets with a curable index matched polymer such as a UV epoxy, and shaping the veneer with a high precision tool such as a diamond turned tool to form facets having the desired shape and degree of flatness.

Figure 4:
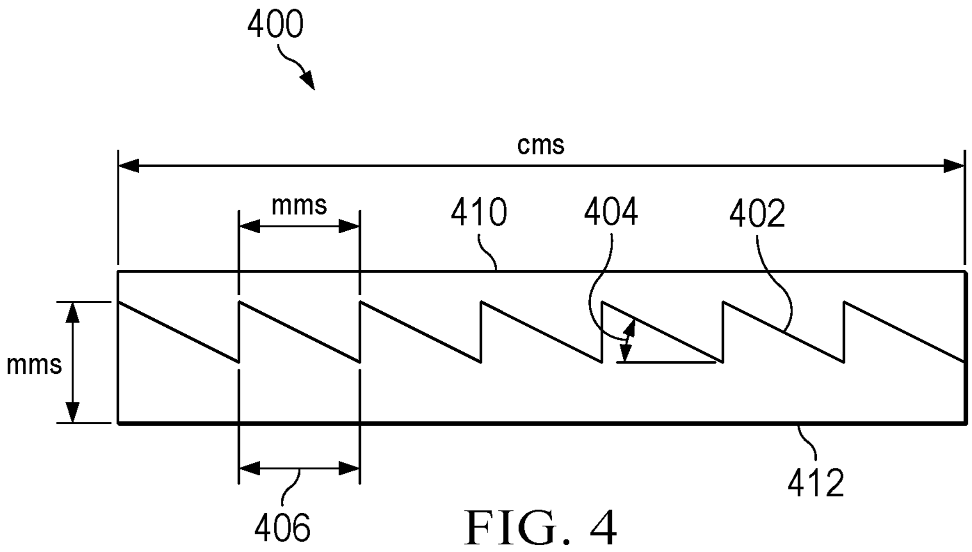
FIG. 4 illustrates a cross-sectional view of a facet structure formed in the surface of a reflective waveguide in accordance with some embodiments.

FIG. 4 illustrates a cross-sectional view of a facet structure 400 formed in the surface of a reflective waveguide in accordance with some embodiments. The facet structure 400 is formed as a light-transmitting substrate, constructed from a transparent material such as plastic, that has a pair of parallel faces 410, 412 (also referred to as major surfaces) and a series of planar partially reflective surfaces deployed within the substrate at an oblique angle to the parallel faces 410, 412. The partially reflective surfaces (referred to herein as facets) are coated with partially reflective coatings that are applied to at least part of the sides or surfaces of the facet structure 400. The coatings are designed with reflective characteristics such that the coatings are at least partially reflective to incident light having particularly corresponding characteristics in order to generate a desired reflectivity characteristic.

As shown in the depicted embodiment, the facet structure 400 includes a series of facets. Each facet has a height on the order of 100's of microns and width in the range of millimeters, and the series of facets collectively has a width in the range of centimeters. Each facet has top surface 402 that slopes at an angle 404 with respect to a lateral dimension of the series of facets and is separated by a distance referred to as a pitch 406 from the next facet. The top surface 402 of each facet is formed to have a desired shape and smoothness. For example, in the illustrated embodiment, each facet has a flat top surface 402. In some embodiments, the top surface 402 of each facet is curved.

The facet structure 400 is configured to form at least one of an incoupler, such as IC 302, an exit pupil expander, such as EPE 304, and an outcoupler, such as OC 306. In some embodiments, characteristics of the facet structure 400 varies between portions used as the IC 302, the EPE 304, and the OC 306. For example, in some embodiments, the pitch 406 for any one of the IC 302, the EPE 304, and the OC 306 varies from the pitch 406 for any other of the IC 302, the EPE 304, and the OC 306. In some embodiments, the angle 404 of the top surface 402 of the facet structure 400 varies between one or more of the IC 302, the EPE 304, and the OC 306. Thus, in some embodiments, the gratings of each of the IC 302, the EPE 304, and the OC 306 are not parallel to each other.

Figure 5:
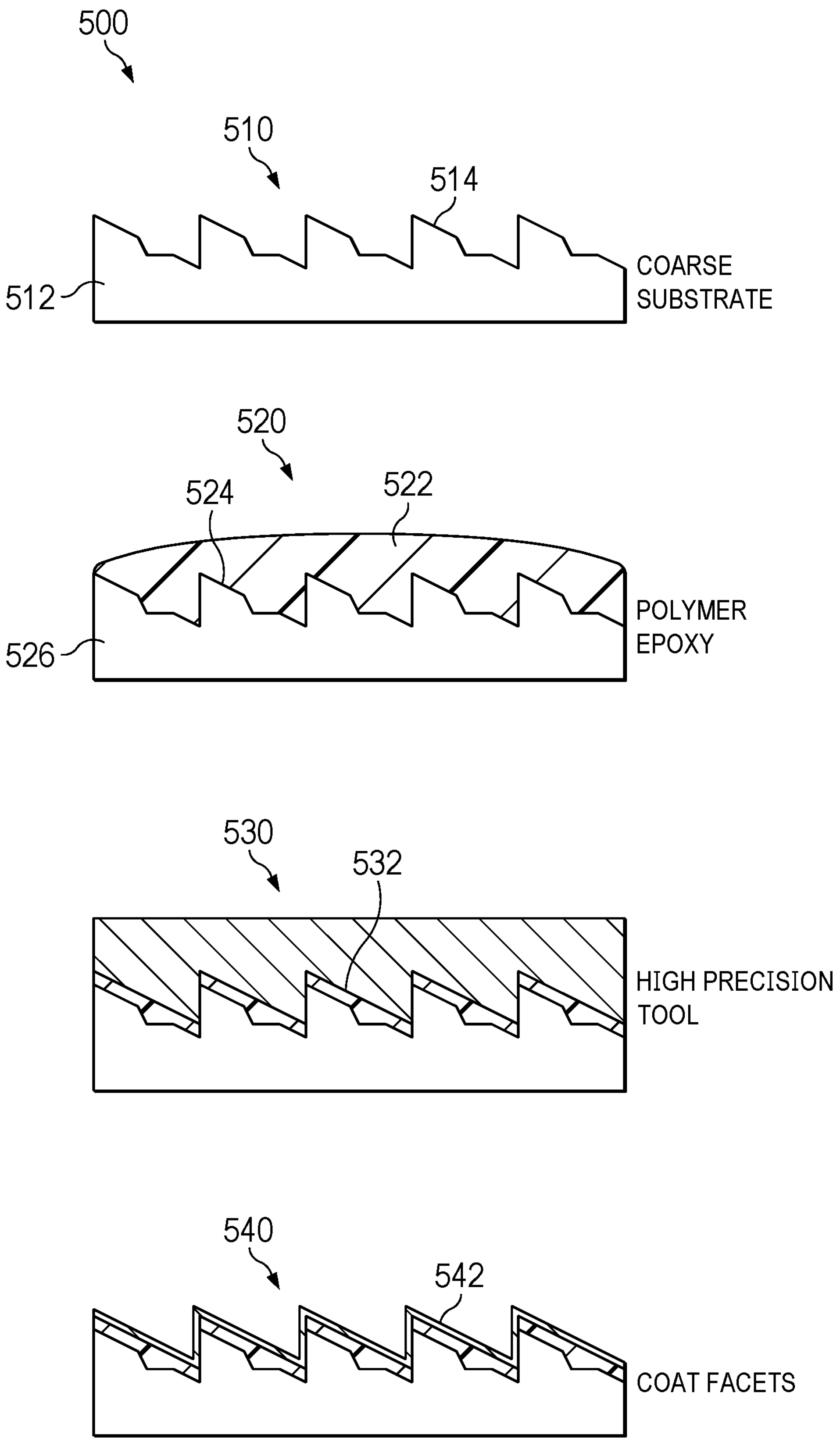
FIG. 5 illustrates stages of a process used in the creation of a series of facets in an optical substrate that forms optical structures of a waveguide, in accordance with some embodiments.

FIG. 5 illustrates stages of a process 500 used in the creation of a series of facets in an optical substrate that forms optical structures of a waveguide, in accordance with some embodiments. At stage 510, a coarse substrate 512 is formed having a series of facets with a shape 514 that roughly approximates a desired shape and smoothness of the series of facets. In some embodiments, the coarse substrate 512 is plastic that is injection molded to form a near-form substrate that is within hundreds of microns of the desired shape and smoothness of the series of facets. The injection molding process typically occurs at relatively high temperatures (i.e., at a temperature above the melting point of the substrate material). As the coarse substrate 512 cools following the injection molding process, shrinkage of the substrate material can occur, leading to changes in the topology of the top surface and bottom surface. In some embodiments, the coarse substrate 512 is compression injection molded to form the near-form substrate, which can reduce the amount of shrinkage and improve surface figure control. By imposing more relaxed precision controls on the forming of the coarse substrate 512 (i.e., by allowing a tolerance of hundreds of microns of the desired shape and smoothness of the series of facet), the coarse substrate 512 can be formed using conventional techniques at a relatively low cost.

At stage 520, a top major surface 524 of the coarse substrate 512 is coated with a veneer 522. In some embodiments, a bottom major surface 526 of the coarse substrate 512 is also coated with the veneer 522. In some embodiments, the veneer is a curable polymer such as a UV epoxy (i.e., an epoxy that is curable under ultraviolet light) having a refractive index that is closely matched to the refractive index of the coarse substrate 512 material. Matching the refractive indices of the coarse substrate 512 material and the veneer 522 propagates a larger percentage of energy of display light into the substrate material. The veneer 522 is applied to the coarse substrate 512 in some embodiments using ink jet-type spreading.

At stage 530, the veneer 522 is shaped with a high-precision tool to form high-precision facet surfaces 532 having the desired shape and degree of smoothness. In some embodiments, the veneer 522 is shaped by diamond turning a mold to form the high-precision facet surfaces 532 on the veneer 522. In embodiments in which both the top major surface 524 and the bottom major surface 526 are coated with the veneer 522, both the top major surface 524 and the bottom major surface 526 are shaped by diamond turned tools. For example, in some embodiments, the coarse substrate 512 is coated with the veneer 522 on both major surfaces and is then sandwiched between two high-precision tools to shape the veneer 522 on both major surfaces to the desired shape and degree and smoothness.

After shaping, the veneer 522 is cured to harden into a final shape. By forming the final shape of the facet surfaces 532 with a thin layer of veneer (e.g., polymer), the facet surfaces 532 are less affected by shrinkage and a higher degree of precision is attainable.

At stage 540, the facet surfaces 532 are coated with a reflective or partially reflective coating 542. In some embodiments, the reflective coating 542 comprises a thin film dielectric stack. The resulting reflective facet structure is then encapsulated (i.e., embedded) in a plastic waveguide in some embodiments. The reflective coating 542 is applied using an adhesive layer (not shown) in some embodiments. In other embodiments, the reflective coating 542 is adhered to the veneer 522 by the encapsulation process when the reflective facet structure is embedded in a plastic waveguide.

Figure 6:
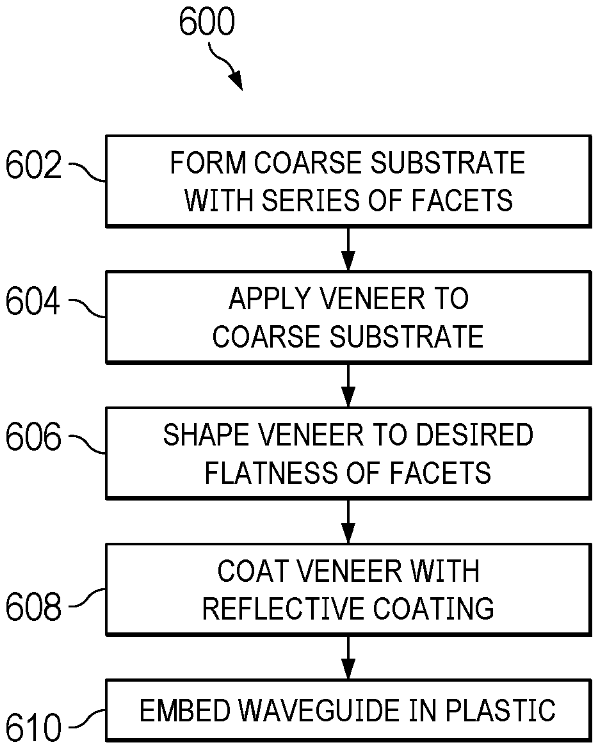
FIG. 6 is a flow diagram illustrating a method of manufacturing a series of facets of a reflective waveguide using a coarse substrate and a veneer in accordance with some embodiments.

FIG. 6 is a flow diagram illustrating a method 600 of manufacturing a series of facets of a reflective waveguide using a coarse substrate and a veneer in accordance with some embodiments. In some embodiments, the method is used to produce a reflective waveguide such as waveguide 202 having a series of high-precision reflective facets such as facet structure 400 illustrated in FIG. 4.

At step 602, a coarse substrate 512 is formed having a series of facets with a shape 514 that is within hundreds of microns of a desired shape and smoothness of the series of facets. The coarse substrate 512 is formed by compression injection molding a plastic substrate in some embodiments. Forming the coarse substrate 512 typically occurs at a relatively high temperature.

After the coarse substrate 512 has cooled, at step 604, a thin veneer 522 is applied to the coarse substrate 512. In some embodiments, the veneer 522 comprises a curable polymer such as an index-matched UV epoxy. In some embodiments, the veneer 522 is applied to a first major surface of the coarse substrate 512, and in other embodiments, the veneer 522 is also applied to a second major surface of the coarse substrate 512. The veneer 522 is applied using ink jet-type spreading in some embodiments.

At step 606, the veneer 522 is shaped to a desired shape and smoothness of the series of facets. In some embodiments, the desired shape of the top surface 402 of each facet is flat, and in other embodiments, the desired shape of the top surface 402 of each facet is curved. The desired smoothness of the top surface 402 of each facet refers to the degree of roughness, or variation, in the topology of the top surface 402. In some embodiments, the veneer 522 is shaped with a high-precision tool such as a diamond turning tool.

At step 608, the veneer 522 is coated with a reflective or partially reflective coating 542 such as a thin film dielectric stack. In some embodiments, the reflective or partially reflective coating 542 is applied to the veneer 522 with an adhesive layer.

At step 610, the series of facets is embedded in a plastic waveguide to form a reflective waveguide. In embodiments in which the reflective or partially reflective coating 542 is not applied to the veneer 522 with an adhesive layer, the plastic waveguide in which the series of facets is embedded adheres the reflective or partially reflective coating 542 to the veneer 522.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

forming a coarse substrate of a reflective waveguide structure, the coarse substrate having a series of facets and comprising a first surface and a second surface opposite the first surface, wherein at least one of the first surface and the second surface is formed to have approximately a desired shape and surface flatness;

coating the first surface of the coarse substrate with a veneer comprising a curable polymer; and shaping the veneer to achieve the desired shape and surface flatness of the series of facets.

2. The method of claim 1, further comprising:

coating the second surface of the coarse substrate with the veneer.

3. The method of claim 1, further comprising:

coating the veneer with a reflective coating.

4. The method of claim 3, wherein the reflective coating comprises a thin film dielectric stack.

5. The method of claim 1, wherein the veneer comprises a curable index-matched epoxy.

6. The method of claim 1, wherein forming the coarse substrate comprises:

compression injection molding a plastic substrate to form a near-form substrate that is within hundreds of microns of the desired shape and surface flatness of the series of facets; and cooling the coarse substrate, wherein coating the first surface of the coarse substrate with the veneer comprises applying the veneer after the coarse substrate has cooled.

7. The method of claim 1, wherein shaping the veneer comprises using a diamond turned tool to mold the veneer to produce the reflective waveguide structure having the desired shape and surface flatness of the series of facets.

8. The method of claim 1, further comprising:

embedding the reflective waveguide structure in plastic.

9. A method, comprising:

applying a veneer comprising a curable polymer to a first surface of a coarse substrate having a series of facets, wherein the first surface is formed to have approximately a desired shape and surface flatness; and shaping the veneer to produce a reflective waveguide structure having the desired shape and surface flatness of the series of facets.

10. The method of claim 9, further comprising:

compression injection molding a plastic substrate to produce the coarse substrate with the series of facets having a shape and surface flatness that is within hundreds of microns of the desired shape and surface flatness of the series of facets; and cooling the coarse substrate, wherein applying the veneer comprises applying the veneer after the coarse substrate has cooled.

11. The method of claim 9, further comprising:
coating a second surface of the coarse substrate with the veneer.

12. The method of claim 9, further comprising:
coating the veneer with a reflective coating.

13. The method of claim 12, further comprising:
embedding the reflective waveguide structure in plastic.

14. A waveguide, comprising:
a coarse substrate having a series of facets and comprising a first surface and a second surface opposite the first surface, wherein at least one of the first surface and the second surface is formed to have approximately a desired shape and surface flatness; and
a veneer comprising a curable polymer coating the first surface, wherein the veneer is shaped to achieve the desired shape and surface flatness of the series of facets.

15. The waveguide of claim 14, further comprising:
a veneer comprising a curable polymer coating the second surface.

16. The waveguide of claim 14, further comprising:
a reflective coating on the veneer.

17. The waveguide of claim 16, wherein the reflective coating comprises a thin film dielectric stack.

18. The waveguide of claim 14, wherein the veneer comprises a curable index-matched epoxy.

19. The waveguide of claim 14, wherein the coarse substrate comprises a compression injection molded plastic substrate having a shape that is within hundreds of microns of the desired shape and surface flatness of the series of facets, and wherein the veneer is applied to the first surface after cooling the coarse substrate.

20. The waveguide of claim 14, wherein the waveguide is embedded in plastic.

* * * * *